US011126628B2

(12) United States Patent
Levin

(10) Patent No.: US 11,126,628 B2
(45) Date of Patent: *Sep. 21, 2021

(54) SYSTEM, METHOD AND COMPUTER-READABLE MEDIUM FOR ENHANCING SEARCH QUERIES USING USER IMPLICIT DATA

(71) Applicant: eBay Inc., San Jose, CA (US)

(72) Inventor: Moshe Levin, San Francisco, CA (US)

(73) Assignee: EBAY INC., San Jose, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/277,994

(22) Filed: Feb. 15, 2019

(65) Prior Publication Data

US 2019/0179819 A1   Jun. 13, 2019

Related U.S. Application Data

(63) Continuation of application No. 14/699,168, filed on Apr. 29, 2015, now Pat. No. 10,210,215.

(51) Int. Cl.
*G06Q 30/00* (2012.01)
*G06F 16/2457* (2019.01)
(Continued)

(52) U.S. Cl.
CPC ...... *G06F 16/2457* (2019.01); *G06F 16/3325* (2019.01); *G06F 16/9535* (2019.01);
(Continued)

(58) Field of Classification Search
None
See application file for complete search history.

(56) References Cited

U.S. PATENT DOCUMENTS 7,050,992 B1   5/2006   Bowman et al.
7,412,442 B1   8/2008   Vadon et al.
(Continued)

FOREIGN PATENT DOCUMENTS

CN        101946249 A      1/2011
CN        102169503 A      8/2011
WO     2016/176274 A1    11/2016

OTHER PUBLICATIONS

Wang, Xuanhui, Mining Term Association Patterns from Search Logs for Effective Query Reformulation, Oct. 26, 2008, ACM, pp. 479-488 (Year: 2008).*

(Continued)

*Primary Examiner* — Jeffrey A. Smith
*Assistant Examiner* — Timothy J Kang
(74) *Attorney, Agent, or Firm* — Shook, Hardy & Bacon L.L.P.

(57) ABSTRACT

Systems and methods are disclosed for enhancing user queries. In one embodiment, a method includes receiving user data from a plurality of users in respective user sessions where the user data for each user includes at least one manufacturer-identified term for a product and at least one user term for the product, associating the user term for the product and the manufacturer-identified term for the product in response to receiving the user term and the manufacturer-identified term within a user session from a threshold number of users, and returning search results based on the associated manufacturer-identified term in response to receiving a search query that includes the user term.

20 Claims, 11 Drawing Sheets

(51) Int. Cl.
  *G06Q 30/06* (2012.01)
  *G06Q 30/02* (2012.01)
  *G06F 16/332* (2019.01)
  *G06F 16/9535* (2019.01)

(52) U.S. Cl.
  CPC ..... *G06Q 30/0256* (2013.01); *G06Q 30/0625* (2013.01); *G06Q 30/0633* (2013.01)

(56) References Cited

U.S. PATENT DOCUMENTS

| | | | |
|---|---|---|---|
| 8,234,265 | B1 | 7/2012 | Yagnik |
| 8,463,658 | B2* | 6/2013 | Racco ............... G06Q 30/0277 705/26.1 |
| 8,463,769 | B1 | 6/2013 | Enderton |
| 8,949,107 | B1* | 2/2015 | Bhagat ................ G06F 17/275 704/8 |
| 9,336,317 | B2* | 5/2016 | Li ...................... G06F 16/9535 |
| 10,210,215 | B2 | 2/2019 | Levin |
| 2007/0016545 | A1 | 1/2007 | Broder et al. |
| 2008/0065694 | A1 | 3/2008 | Qian |
| 2008/0147626 | A1 | 6/2008 | Lapointe |
| 2008/0294321 | A1 | 11/2008 | Yamakado et al. |
| 2008/0294621 | A1* | 11/2008 | Kanigsberg ............ G06Q 30/02 |
| 2009/0204608 | A1 | 8/2009 | Musgrove et al. |
| 2012/0123904 | A1 | 5/2012 | Foerster |
| 2012/0232897 | A1 | 9/2012 | Pettyjohn et al. |
| 2013/0151363 | A1 | 6/2013 | Khosravy et al. |
| 2014/0358904 | A1 | 12/2014 | Nayak et al. |
| 2015/0095194 | A1 | 4/2015 | Maslovskis |
| 2015/0120689 | A1* | 4/2015 | Miao ................... G06F 16/951 707/706 |
| 2015/0379571 | A1 | 12/2015 | Grbovic et al. |
| 2016/0267576 | A1* | 9/2016 | Crossman Sullivan ................. G06Q 30/0601 |
| 2016/0321727 | A1 | 11/2016 | Levin |

OTHER PUBLICATIONS

Extended European Search Report Received for European Patent Application No. 16787028.6, dated Aug. 13, 2018, 8 pages.
International Preliminary Report on Patentability received for PCT Application No. PCT/US2016/029471, dated Nov. 9, 2017, 7 pages.
International Search Report received for PCT Application No. PCT/US2016/029471, dated Jul. 27, 2016, 3 pages.
International Written Opinion received for PCT Application No. PCT/US2016/029471, dated Jul. 27, 2016, 5 pages.
Wang et al., "Mining Term Association Patterns from Search Logs for Effective Query Reformulation", Oct. 26, 2008, ACM, pp. 479-488.
Advisory Action received for U.S. Appl. No. 14/699,168, dated Jan. 16, 2018, 3 pages.
Amendment Under 37 CFR 1.312 filed on Oct. 16, 2018, for U.S. Appl. No. 14/699,168, 9 pages.
Applicant Initiated Interview Summary received for U.S. Appl. No. 14/699,168, dated Jul. 17, 2018, 3 pages.
Final Office Action received for U.S. Appl. No. 14/699,168, dated Oct. 25, 2017, 19 pages.
Non-Final Office Action received for U.S. Appl. No. 14/699,168, dated Apr. 6, 2018, 18 pages.
Non-Final Office Action received for U.S. Appl. No. 14/699,168, dated Jun. 6, 2017, 18 pages.
Notice of Allowance received for U.S. Appl. No. 14/699,168, dated Sep. 20, 2018, 15 pages.
Response to Final Office Action filed on Dec. 22, 2017, for U.S. Appl. No. 14/699,168, dated Oct. 25, 2017, 22 pages.
Response to Non-Final Office Action filed on Jun. 28, 2018, for U.S. Appl. No. 14/699,168 , dated Apr. 6, 2018, 20 pages.
Response to Non-Final office action filed on Sep. 6, 2017, for U.S. Appl. No. 14/699,168, dated Jun. 6, 2017, 11 pages.
Response to European Search Report Filed on Feb. 28, 2019 for European Patent Application No. 16787028.6 dated Aug. 13, 2018, 13 pages.
Response to Amendment under 37 CFR 1.312 filed on Oct. 29, 2018 for U.S Appl. No. 14/699,168, dated Oct. 16, 2018, 2 pages.
Communication pursuant to Art. 94(3) EPC Received for European Patent Application No. 16787028.6, dated Dec. 10, 2019, 6 pages.
Response to Communication Pursuant to Article 94(3) filed on Mar. 4, 2020 for European Patent Application No. 16787028.6, dated Dec. 10, 2019, 19 pages.

* cited by examiner

SYSTEM, METHOD AND COMPUTER-READABLE MEDIUM FOR ENHANCING SEARCH QUERIES USING USER IMPLICIT DATA

RELATED APPLICATION

This application is a continuation of U.S. patent application Ser. No. 14/699,168, titled "ENHANCING SEARCH QUERIES USING USER IMPLICIT DATA," filed Apr. 29, 2015, which is incorporated herein by reference in its entirety.

TECHNICAL FIELD

Embodiments of the present disclosure relate generally to data processing and, more particularly, but not by way of limitation, to enhancing search queries using user implicit data.

BACKGROUND

Conventionally, search engines function by receiving search parameters and returning results related to the parameters. In a commerce context, a manufacturer uses a set of search terms to identify a specific product. In response to a user submitting one of these manufacturer terms to find a product, the search engine finds products for the manufacturer.

However, users are not always aware which terms a manufacturer uses to describe the product, and may enter other terms that yield inaccurate results. Although the desired product from a manufacturer may be contained in the results, too many erroneous results may overwhelm or otherwise complicate a user's access to the product.

BRIEF DESCRIPTION OF THE DRAWINGS

Various ones of the appended drawings merely illustrate example embodiments of the present disclosure and cannot be considered as limiting its scope.

Figure 1:
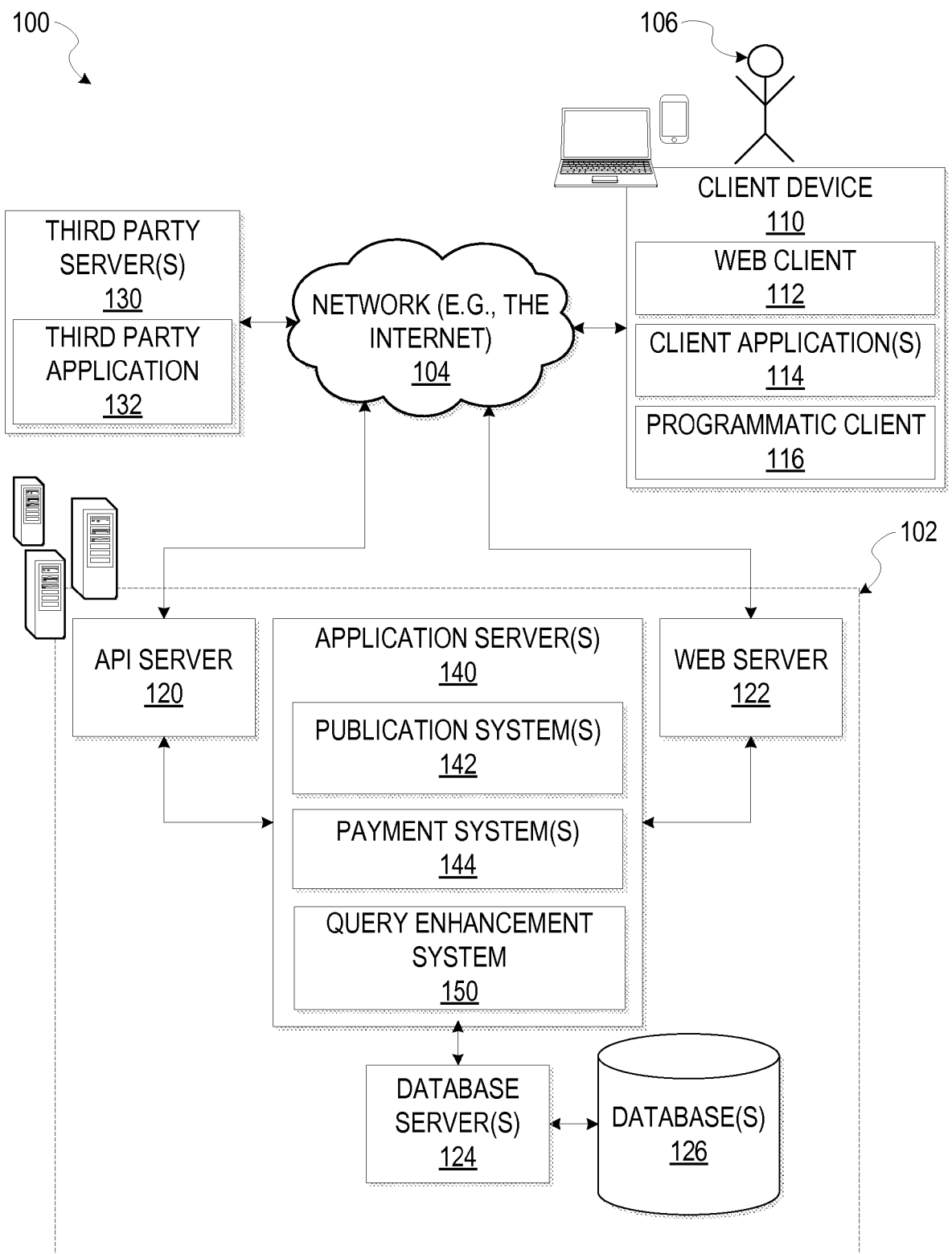
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, systems and methods can be used to associate at least one user term with at least one manufacturer-identified term for a product within a user session where the manufacturer-identified term is related to a product and the user term is not a manufacturer-identified term. Once a user term is associated with a manufacturer-identified term, results for the manufacturer-identified term can be presented to users that search only for the user term. In an example, many users use a user term and a manufacturer-identified term in their respective user sessions. In response, the system associates the user term and the manufacturer-identified term. The system then uses the association to return search results based on the manufacturer-identified term in response to receiving a user query that includes the user term.

Various systems and methods are described to gather user data in user sessions with a networked marketplace. In one embodiment, a system determines products the user is interested in purchasing based on how the user interacts with the networked marketplace. For example, as the user views, selects, or purchases an item, the system determines that the item purchased is the item the user has been searching for.

As many users interact with the networked marketplace, a query enhancement system analyzes the user data and determines associations between manufacturer-identified terms, and other terms users may be using to describe a product that are not included in a list of terms used by the manufacturer of the product. In one example, users may describe a product as a "Beemer." Because "Beemer" is not included in a list of manufacturer terms to describe a "BMW" vehicle, the networked marketplace may not include "BMW" search results in response to a user searching for a "Beemer."

However, as many users include the search term "Beemer" and eventually purchase a "BMW" product, the query enhancement system associates a user term "Beemer" with a manufacturer-identified term "BMW." Therefore, in later sessions with other users, the query enhancement system may generate search results using "BMW" in response to a user searching for "Beemer." The query enhancement system therefore learns which products users are interested in, based on the user terms, by receiving the user terms and manufacturer-identified terms in respective user sessions.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), client application(s) 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital items within the networked system 102.

In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications 114 (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the networked system 102, on an as-needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application server 140. The application server(s) 140 may host one or more publication system 142 and payment system 144, each of which may comprise one or more modules or applications and each of which may be embodied as hardware, software, firmware, or any combination thereof. The application server(s) 140 is, in turn, shown to be coupled to one or more database server 124 that facilitates access to one or more information storage repositories or database(s) 126. In an example embodiment, the database(s) 126 is a storage device that stores information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 may provide a number of publication functions and services to users 106 that access the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system(s) 142.

The query enhancement system 150 associates at least one user term with at least one manufacturer-identified term within a user session where the manufacturer-identified term is related to a product and the user term is not a manufacturer-identified term. For example, a user may refer to a "hump" as a Camel™ Cigarette. Although the query enhancement system 150 may not recognize "hump" as any official designation, the query enhancement system 150 may associate "hump" with Camel™ Cigarettes in response to a threshold number of users submitting "humps" and "Camel Cigarettes" in a user session.

In other example embodiments, the query enhancement system 150 may communicate with the publication system(s) 142 (e.g., accessing item listings) and payment system(s) 144. In an alternative embodiment, the query enhancement system 150 may be a part of the publication system(s) 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and query enhancement system 150 could also be implemented as standalone software programs, which do not necessarily have networking capabilities.

The query enhancement system 150 may also exist independently of the networked system 102. For example, a client device 110 may be located at an offline location providing access to the networked system 102. In other examples, the query enhancement system 150 is included in a client device 110. For example, the client device 110 may be in a physical library at a remote location (e.g., remote to the networked system 102). The query enhancement system 150 may collect user data to associate user terms unconnected to a certain book, with manufacturer-identified terms that are associated with the book. In this way, a user (e.g., user 106) can access a book using search terms that would typically be insufficient because they, without the associations as described herein, do not sufficiently identify the product. Further, the query enhancement system 150 would not need access to the networked system 102 to make the associations.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
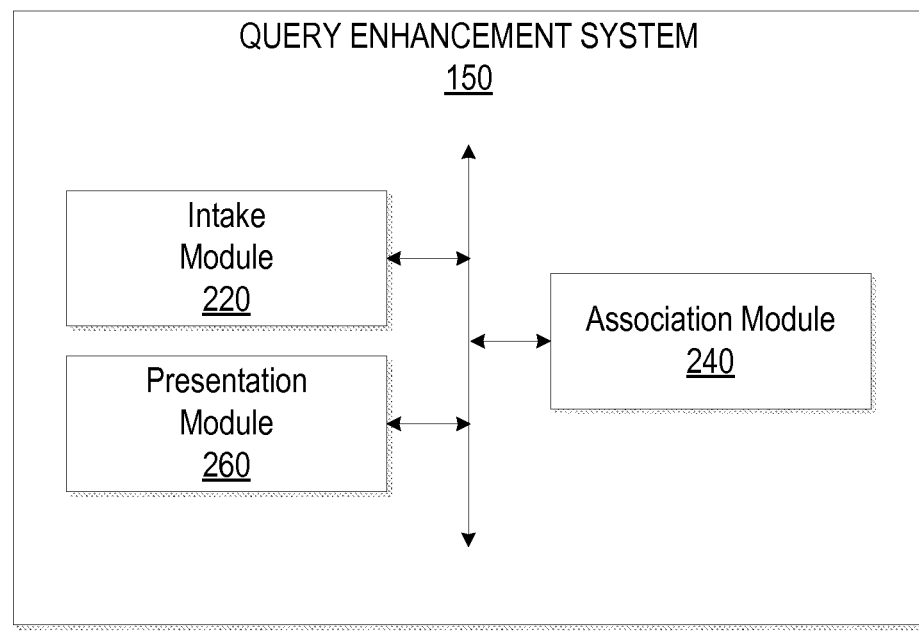
FIG. 2 is block diagram illustrating a query enhancement system according to one example embodiment.

FIG. 2 is block diagram illustrating a system for a query enhancement system 150, which may provide functionality to receive user data, associate at least one user term with at least one manufacturer-identified term, and present enhanced search results to a user.

In some example embodiments, the query enhancement system 150 includes an intake module 220 configured to receive user data from many user sessions, an association module 240 configured to associate a user term with a manufacturer-identified term when they are associated in a threshold number of user sessions, and a presentation module 260 configured to present enhanced search results in response to user terms by presenting search results for the associated manufacturer-identified term or a product associated with the associated manufacturer-identified term.

In one example embodiment, the query enhancement system 150 includes an intake module 220, an association module 240, and a presentation module 260. All, or some, of the modules of FIG. 2, may communicate with each other, for example, via a network coupling, shared memory, and the like.

It will be appreciated that each module 220-260 may be implemented as a single module, combined into other modules, or further subdivided into multiple modules. Other modules not pertinent to example embodiments may also be included, but are not shown.

In one embodiment, the intake module 220 may be configured to receive user data from a plurality of users in respective user sessions. The user data includes at least one manufacturer-identified term for a product and at least one user term for the product that is not a manufacturer-identified term. A user term, as described herein, includes any term that is not a manufacturer-identified term for the product. In certain examples, slang language may be used by users to identify a specific product; however, the slang language may not be recognized by the manufacturer of the product. In other examples, any combination of terms may be used by users to identify a specific product, any of which are not manufacturer-identified terms (thus being user terms).

A manufacturer-identified term is a term that the manufacturer uses to describe their product, including, but not limited to, product IDs, SKU numbers, serial numbers, model numbers, part numbers, official titles, or product descriptions, or any other term used by a manufacturer to identify the product. A search of a manufacturer-related term will usually return the identified product.

A user session, as described herein, includes, but is not limited to, a period of time where a single user searches for a product. A user session may begin when a user first begins searching for a product and may end when the user purchases the product, logs out of their account, after a threshold period of time passes without the user engaging in search activity, the user switches to searching for a different product, or other such termination of search activity, or other, or the like.

In response to many users searching using the user term and interacting with the product (e.g., in a user event), the association module 240 may associate the user term with the manufacturer-identified term. A user event may include a number of actions taken by the user related to a product including selecting the product, purchasing the product, placing the product in a virtual shopping cart, or placing the product on a watch list, or any other action taken by the user that involves the product.

For example, in a user session, a user may search for "Nike Tiger Shoes." Later, in the same user session, the user may purchase a pair of Nike™ Leopard performance running shoes. In response to many users performing similar actions, the intake module 220 associates "Nike Tiger" with "Nike Leopard" by aggregating the user data from the user session with user data from other user sessions where users searched for "Nike Tiger Shoes." Of course, the order of term usage by a user is not limited in any way.

In another embodiment, the intake module 220 receives user data by aggregating user sessions where users engage in a user event involving the product. In one example, the intake module 220 aggregates the user data from the user session with other user sessions where the users purchased a pair of Nike Leopard performance running shoes. Of course, the intake module 220 may also aggregate based on other user events as described herein.

In other embodiments, the intake module 220 receives and aggregates user data including length of time between the search using a user term and occurrence of a user event.

In other examples, user sessions where a user purchases a red colored variant of a product associated with a manufacturer-identified term may be associated with a user that adds the red colored variant of the product to a wish list.

The query enhancement system 150 may further include an association module 240 configured to associate at least one user term with at least one manufacturer-identified term related to a product in response to receiving user data from the intake module 220.

In an embodiment, the association module 240 associates a user term with a manufacturer-related term where a threshold number of users search for the user term and the manufacturer-identified term or engages in a user action involving the product associated with the manufacturer-identified term in the same session. For example, where a threshold is set at 50 users, in response to more than 50 users searching for "Nike Tiger Shoes" and ending up either searching for "Nike Leopard Shoe" or engaging in a user action involving the Nike Leopard performance running shoe within the same user session, the association module 240 associates the user term "Nike Tiger Shoe" with the manufacturer related term "Nike Leopard Running Shoe."

In an alternative embodiment, the association module 240 may associate a user term and a manufacturer-identified term based on a score for the association. In one embodiment, the association module 240 may weigh data generated in user sessions differently depending on the nature of the user session. For example, in a user session where a user searches for "Nike Tiger Shoe" and then searches for "Nike Leopard Shoe" without submitting other queries between the searches, the association module 240 may give greater weight to the association based on a time difference between receiving the user terms and the manufacturer-identified terms within a threshold period of time. Therefore, a user's use of a user term and a manufacturer term within a smaller threshold period of time may result in a higher weight.

Therefore, in certain embodiments, a threshold score may be exceeded using comparatively little total aggregated user data if the user sessions are heavily weighted. For example, in response to five users including the user term and the manufacturer-identified term within a threshold period of time, the association module 240 may associate the user term and the manufacturer-identified term.

Accordingly, a user session where the user searches for "Nike Tiger Shoe" and then immediately searches for "Nike Leopard Shoe" might be given a greater weight by the association module 240 than if the user had searched for "Nike Leopard Shoe" twenty minutes after "Nike Tiger Shoe."

In one specific example, user of a user term and a manufacturer identified term in a user session results in ten points. Furthermore, the ten points may be scaled according to a time period between use of the user term and use of the manufacturer identified term. For example, use of a manufacturer-identified immediately following use of a user term may result in double points (e.g. 20 points). Also, use of the manufacturer-identified term at or near the end of the user session may not result in alteration of the points because the manufacturer-identified term is as far away (temporally) as use of the user term.

Accordingly, the association module 220 may multiple the points by a weight factor that is scaled according to when the user term and the manufacturer identified terms are used in the user session. Where use of the manufacturer-identified term occurs concurrently or immediately following use of the user term the scaled multiplier is 2.0. Also, use of the manufacturer-identified term occurring at the end of the user session results in a scaled multiplier of 1.0. Therefore, use of the manufacturer-identified term at any time period may be linearly scaled according to when the manufacturer-identified term is received.

In one specific example, the intake module 220 receives the user term is received at the beginning of the user session and receives the manufacturer-identified term half way between the beginning and the end of the user session. The association module 240 may then apply a 50% bonus multiplier to the association (because usage of the manufacturer-identified term occurs 50% of time between use of the user term and end of the user session). Of course, one skilled in the art may recognize that other time periods may be used in this disclosure is not limited in this regard. In another embodiment, the association module 240 associates the user term and the manufacturer-identified term in response to a score for the association exceed a threshold value. For example, a threshold value may be 500 points and the association module 240 adds points for associations as previously described. In response to the total points for the association exceeding 500 points, the presentation module 260 presents search results based on the manufacturer-identified term in response to the intake module 220 receiving a query that includes the user term.

In another example, a user session where the user searches "Nike Leopard Shoe" and later purchases a pair of Nike Leopard performance running shoes may be given greater weight by the association module 240 than a user session where the user merely viewed the shoes after the search.

Therefore, some user events may be weighed more heavily than other user events. In one non-limiting example, the purchase of the product is weighed more than the user placing the product on a watchlist. Of course other user events may be weighed in other ways according to indications from the user, or the like.

In another embodiment, the association module 240 may weigh user terms based on an increased need to be associated with a manufacturer-identified term. For example, a user term that returns zero results would need to be associated with another term in order to generate results. Therefore, the association module 240 may lower the threshold number of user sessions used to associate the user term with a manufacturer-identified term.

In another embodiment, the association module 240 stores associations between user terms using various memory structures as described herein. The association module 240 may store the association on a remote device, a remote service, local storage, or any other location one skill in the art may appreciate. Furthermore, the association module 240 may store the associations in any data structure. For example the association module 240 may store associations in a file on a file system. In another example the association module 240 stores the associations in a database. In one example, the association module 240 may store a record for each association in the database. In one example, each record may include the user term, the associated manufacturer-identified term, and a score for the association. In this embodiment, the association module adds records in the database for each term combination in a user session. In this embodiment, the association module 240 increases a score for each record in response to finding each of the terms in a user session.

In another embodiment, the association module tracks terms (user terms and/or manufacturer-identified terms) used by users in their respective user session, and adds records to the database in response to a threshold number users using the user term and the manufacturer-identified term in a user session. Of course, in this embodiment, the data record need not store a score for the association. Of course, one skilled in the art may appreciate many other ways in which an association may be stored and this disclosure is not limited in this way. In other embodiment, the association module 240 may arrange the user terms and/or the manufacturer-identified terms in various ways including, but not limited to, alphabetically, chronologically, categorically, or in a term hierarchy, or the like.

In another embodiment, the query enhancement system 150 includes a presentation module 260 configured to present results to a user based on associations between user terms and manufacturer-identified terms as determined by the association module 240. For example, in response to receiving a search query from the user that includes a user term, the presentation module 260 may return search results based on the associated manufacturer-identified term. For example, if a user searches for the user term "Nike Tiger Shoe," which the association module 240 has associated with the manufacturer-identified term "Nike Leopard Shoe," then the presentation module 260 will return search results for "Nike Leopard Shoe."

In one embodiment, the intake module 220 receives user queries, selections, indications, views, purchases, and/or other interactions by the user with the network system 102. The association module 240 may be executed as a background process that analyzes data received by the intake module 220. Therefore, the association module 240 may perform as an independent process from the intake module 220 and/or the presentation module 260. Accordingly, the association module 240 may inspect data and make associations without waiting for interactions and/or communication from the intake module 220 and/or the presentation module 260. In one specific example, the intake module 220 stores data received from users in a database. In a separate process, the association module 240 persistently analyzes the data in the database to generate associations as described herein.

In another embodiment, the intake module 220 receives a query from a user and requests enhancement from the association module 240. In response, the association module 240 alters the query according to any associations with user terms that were included in the submitted query. The intake module 220 then submits the query to the publication system 142. The presentation module 260 receives search results based on the query and presents the search results as described herein. In one example embodiment, the intake module 220 receives the query according to a specified standard. For example, the query may include a set of keywords, terms, words, selections, or other, or the like. Therefore, in one example, a user may configure a query using the client device 110, the client device 110 may format the query according to the specified standard and may transmit the query to the intake module 220. The intake module 220 may then interpret the query according to the specified standard. In certain embodiments, the query may be encrypted, compressed, partitioned, or otherwise organized as one skilled in the art may appreciate.

In another embodiment, the presentation module 260 may return results for a product associated with a manufacturer-identified term in response to receiving a user query that includes a user term associated with the manufacturer-identified term. In the above example, if a user searches for the term "Nike Tiger Shoe," which the association module 240 has associated with the manufacturer-identified term "Nike Leopard Shoe," then the presentation module 260 may return a product listing for a pair of Nike Leopard performance running shoes.

Figure 3:
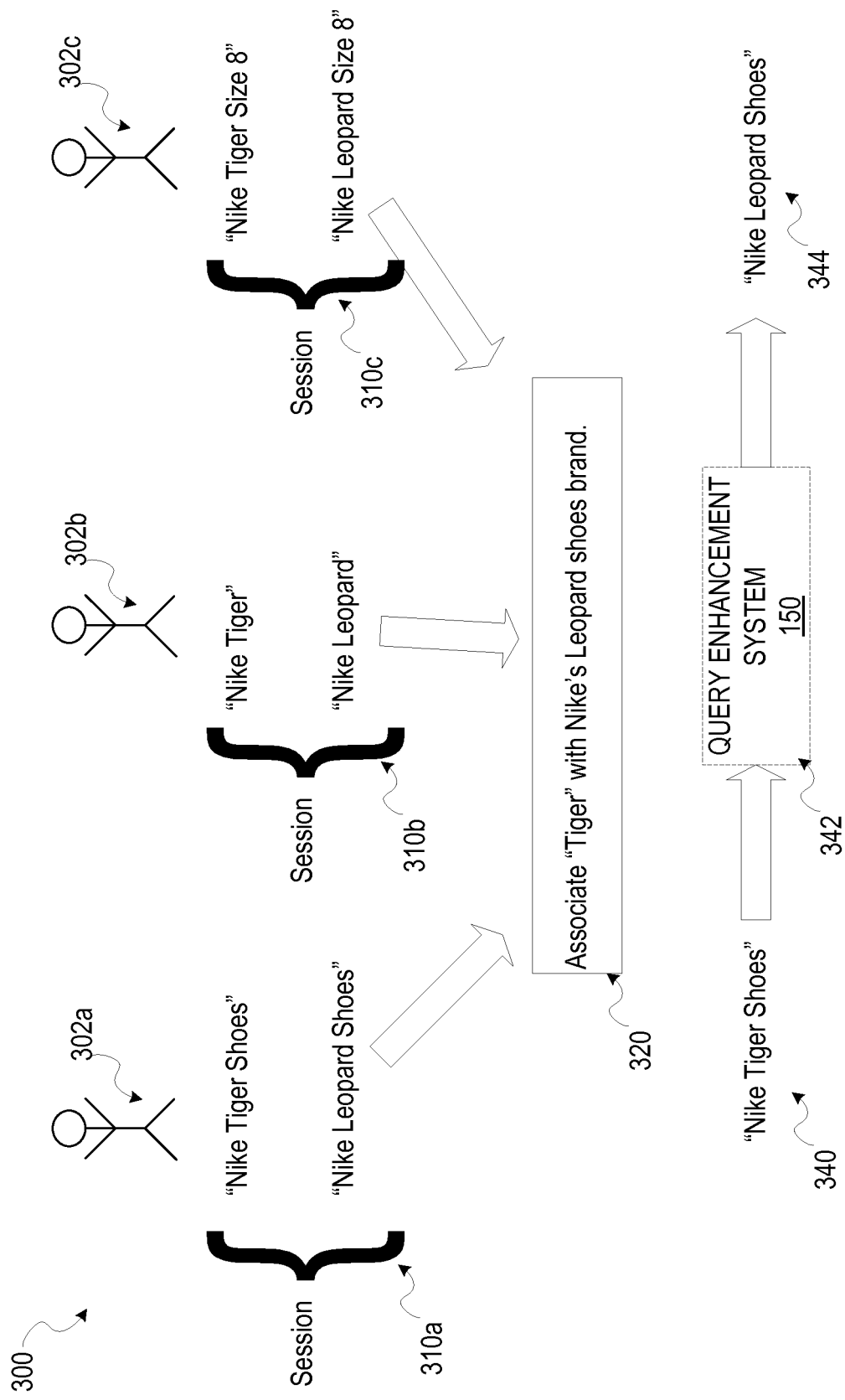
FIG. 3 is an illustration depicting one example of a query enhancement system according to one example embodiment.

FIG. 3 is an illustration depicting one example 300 of a query enhancement system 150 according to one example embodiment. This example 300 includes three users 302 who are searching for "Nike Leopard Running Shoes."

According to this example 300, the user 302a does not know what the Nike Leopard shoes are called, but has seen the shoes and believes they are called Nike Tiger shoes. Therefore, user 302a submits an initial query that includes terms "Nike Tiger Shoes." Because Nike Tiger shoes do not sufficiently specify a manufacturer product (e.g., no shoes made by Nike are called "Tiger" shoes), results from the initial query may be limited. In response to not receiving relevant search results, the user 302a tries other search terms that may identify the Nike Leopard shoes.

In the same session 310a, the user 302a submits a query that includes the search terms "Nike Leopard Shoes." Because "Nike Leopard shoes" identifies a specific Nike model of shoe, search results are significantly more than search results based on the search terms "Nike Tiger shoes."

User 302b, in a separate user session 310b, is also interested in purchasing Nike Leopard shoes. Because Nike Tiger shoes do not specify a shoe made by Nike, a network-based marketplace (e.g., at networked system 102), may return search results for all Nike shoes. In the same session 310b, the user 302b may select a Nike Leopard shoe.

In another, and separate, user session 310c, the user 302c submits an initial query that includes the search terms "Nike Tiger size 8." In the same session 310c, user 302c submits a second query that includes the search terms "Nike Leopard size 8." In this example, the threshold number of users may be three. Because the users 302a, 302b, and 302c submitted queries that included the user term "Tiger" as well as the manufacturer-identified term "Leopard," the association module 240 associates, in an operation 320, the user term "Tiger" with the manufacturer-identified term "Leopard."

After the association module 240 associates the user term with the manufacturer's product, the query enhancement system 150 may receive another query 340 that includes the user term (e.g., "Tiger"). Because the user is searching for Nike shoes, and Tiger is not included in a manufacturer list of shoes made by Nike, the query enhancement system 150 returns, in an operation 342, search results 344 using the associated manufacturer-identified term. For example, the query enhancement system 150 replaces the user term "Tiger" with the manufacturer-identified term "Leopard." In another example embodiment, the query enhancement system 150 modifies the query to includes results based on the "Tiger" user term and the "Leopard" manufacturer-identified term. For example, the query enhancement system may modify the query with "Tiger or Leopard."

Figure 4:
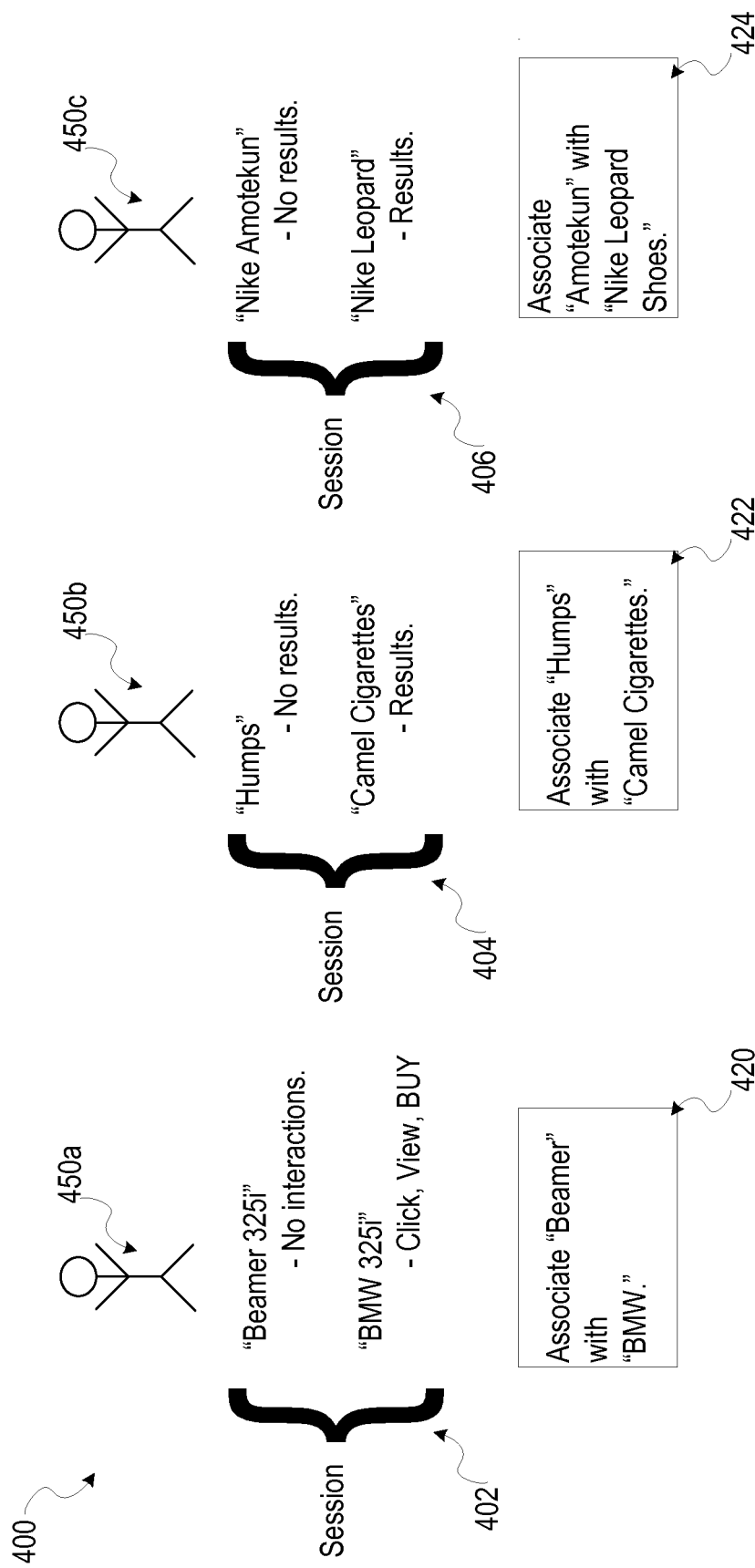
FIG. 4 is an illustration depicting one scenario according to an example embodiment.

FIG. 4 is an illustration depicting several examples in accordance with the present disclosure. These examples include user sessions 402, 404, and 406.

In user session 402, the intake module 220 receives a first query from the user 450a that includes the user term "Beamer." In this example, due to the user term "Beamer" not matching any manufacturer products, the user 450a did not initiate any events with items at the network-based marketplace. In the same session 402, the intake module 220 receives another query that includes a manufacturer term "BMW." The user 450a then interacts with an item at the network-based marketplace by clicking on an item, viewing an item, and purchasing an item that is identified as a "BMW 325i." In response to a threshold number of users providing the user term "Beamer" resulting in relatively few user events, and also providing the manufacturer-identified term "BMW" resulting in an increased number of user events, the association module 240 associates 420 the user term "Beamer" with the manufacturer-identified term "BMW." In another embodiment, the association module 240 associates the user term "Beamer" with the BMW brand of vehicles. Accordingly, the presentation module 260 generates search results based on "BMW" in response to receiving a search query from a user (e.g., user 450*a*) that includes "Beamer."

In another example user session 404, the intake module 220 receives a query from user 450*b* that includes the user term "Humps." In this example, "Humps" is a slang term that does not match any specific manufacturer item. Therefore, the network-based marketplace does not find any results for the user 450*b* query "Humps." In the same session 404 and immediately following the first query (e.g., without submitting other queries in between), the intake module 220 receives a second user 450*b* query that includes a manufacturer-identified term "Camel Cigarettes." Because "Camel Cigarettes" matches a manufacturer item, the network-based marketplace returns search results. In this example, the association module 240 associates 422 "Humps" with "Camel Cigarettes" based on the first query producing no search results, and the second query producing significant search results, and the first and second queries being received in temporally contiguous submissions.

In another example user session 406, the intake module 220 receives a query from user 450*c* that includes a user term "Amotekun." In this example, the user 450*c* does not speak English, but desired to find Nike Leopard shoes. In searching for the shoes, the user 450*c* uses a non-English term to describe the shoes. Because "Amotekun" is not recognized by Nike, the "Nike Amotekun" search query does not yield search results.

In the same session 406, the user 450*c* may also submit a search query that includes the manufacturer-identified terms "Nike Leopard." Because this query yielded search results while the earlier query ("Nike Amotekun") yielded no results, and both queries included the brand name Nike, the association module 240 associates 424 the word "Amotekun" with the product "Nike Leopard." Therefore, although Nike may not have recognized that Amotekun means leopard in Yoruban, the presentation module 260 presents search results for "Nike Leopard" in response to receiving a search query including the terms "Nike Amotekun."

In other embodiments, the query enhancement system 150 associates seemingly random terms with specific products in response to a sufficient number of users using the terms and the manufacturer-identified terms within a user session. Therefore, the query enhancement system 150 learns slang, foreign languages, acronyms, and/or other terms used by users to identify a product.

Figure 5:
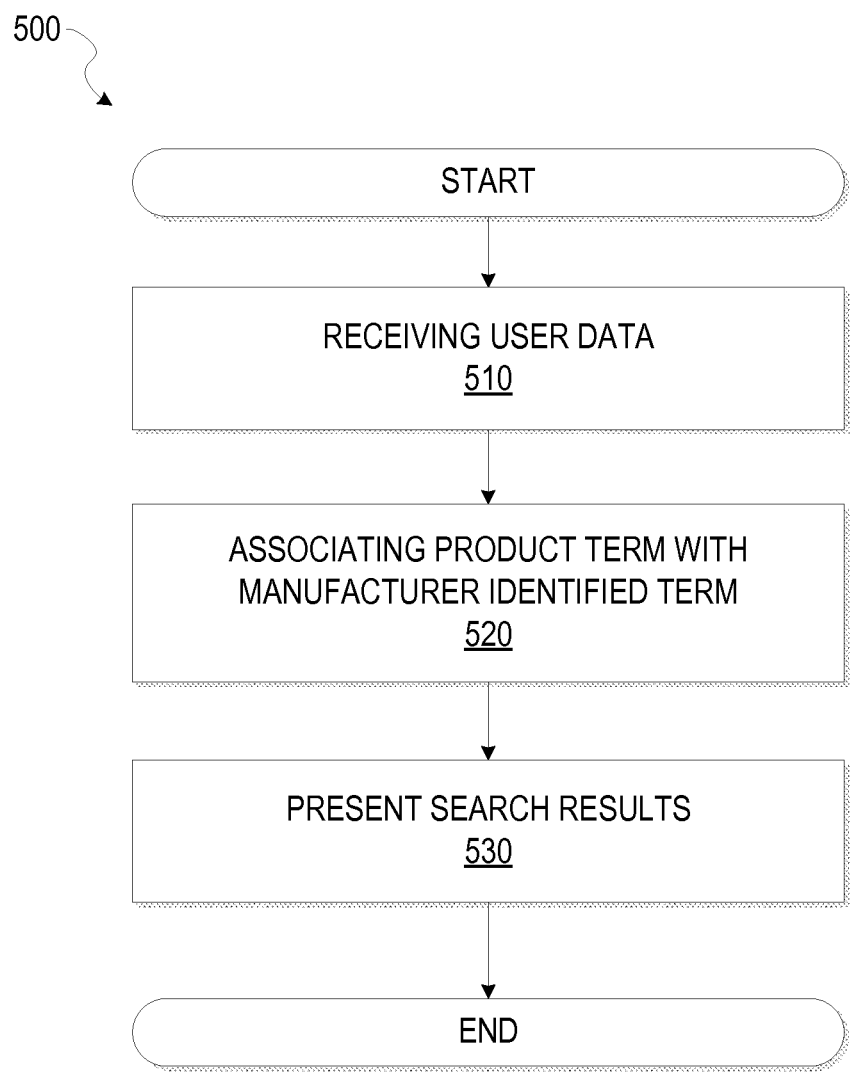
FIG. 5 is a flow diagram illustrating an example method according to one example embodiment.

FIG. 5 is a flow diagram illustrating an example method 500 for enhancing user queries according to one example embodiment. Operations in the method 500 may be performed by the query enhancement system 150, using modules described above with respect to FIG. 2. As shown in FIG. 5, the method 500 includes operations 510, 520, and 530.

In one embodiment, the method 500 begins and at operation 510, the intake module 220 receives user data from many users in respective user sessions. The data includes user queries, selections, views, purchases, or other data submissions made by a user in a user session. The intake module 220 receives at least one manufacturer-identified term for a product and at least one user term for the product that is not a manufacturer-identified term. The user term may include a slang term, a term in another language, or any other term used by many people to identify the product, but is not recognized by the manufacturer.

The method 500 continues at operation 520 and the association module 240 associates the user term for the product and the manufacturer-identified term for the product in response to receiving the user term and the manufacturer-identified term within a user session from a threshold number of users. The method 500 continues at operation 530 and the presentation module 260 causes presentation of search results to a user based on the associated manufacturer-identified term in response to receiving a search query that includes the user term.

In another example embodiment, the operation 530 includes presenting search results based on both the user term and the manufacturer-identified term. In this example, although a seller of an item may have used the user term the describe the item, a potential customer of the network-based marketplace may submit a query that includes the manufacturer-identified term, but not the user term. Accordingly, upon receiving a query that includes the manufacturer-identified term, the presentation module 260 could still determine and return search results that include the item being described using the manufacturer-identified term, but not the user term.

Figure 6:
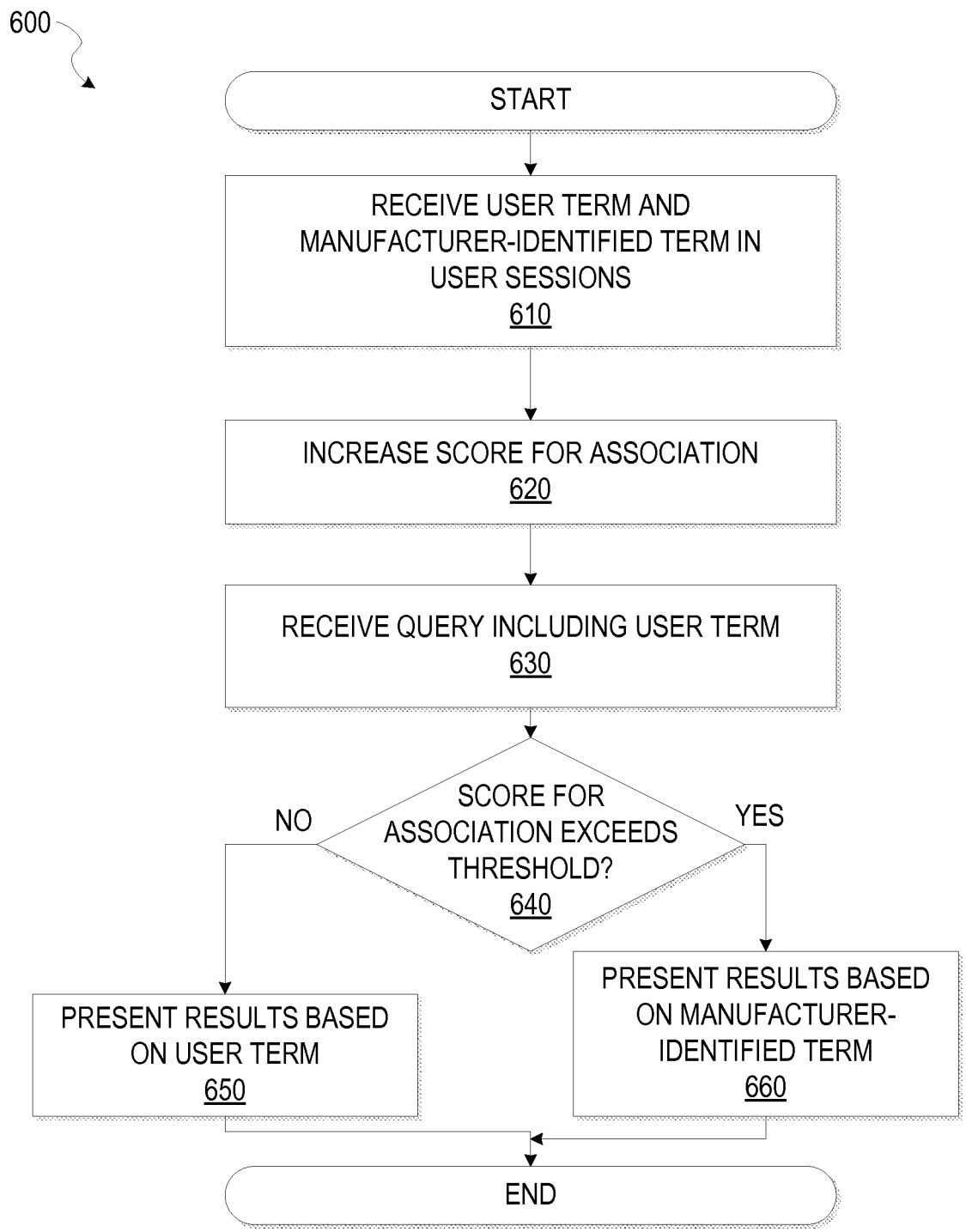
FIG. 6 is a flow diagram illustrating an example method for enhancing user queries according to one example embodiment.

FIG. 6 is a flow diagram illustrating an example method 600 for enhancing user queries according to another example embodiment. Operations in the method 600 may be performed by the query enhancement system 150, using modules described above with respect to FIG. 2. As shown in FIG. 6, the method 600 includes operations 610, 620, 630, 640, 650, and 660.

In one embodiment, the method 600 begins and at operation 610, the intake module 220 receives user terms and manufacturer-identified terms in respective user sessions for two or more users. The method 600 continues at operation 620 and the association module 240 increases a score for the association. The association module 240, as previously described, may increase a score for the association based, at least in part, on a time difference between use of the user term and user of the manufacturer-identified term.

The method 600 continues at operation 630 and the intake module 220 receives a query that includes the user term from another user. The method 600 continues at operation 640 and the association module 240 determines whether a score for an association for the user term exceeds a threshold value. In response to the score for the association not exceeding the threshold value, the method 600 continues at operation 650 and the presentation module 260 presents search results based on the user term. In response to the score for the association exceeding the threshold value, the method 600 continues at operation 660 and the presentation module presents search results based on the manufacturer-identified term. In another example embodiment, the operation 660 also includes the presentation module presenting search results based on both the user term and the manufacturer-identified term.

Figure 7:
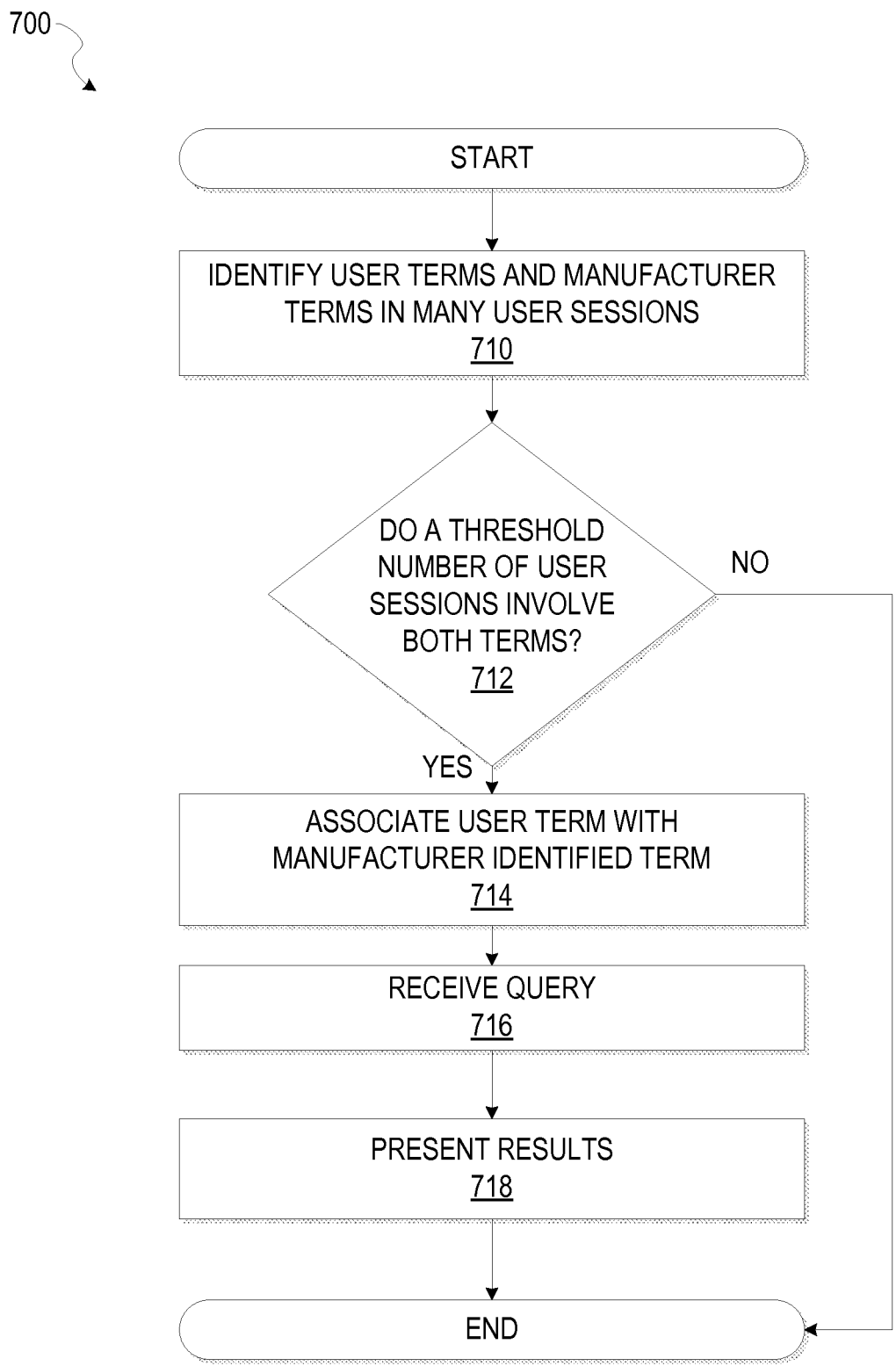
FIG. 7 is a flow diagram illustrating an example method for enhancing user queries according to one example embodiment.

FIG. 7 is a flow diagram illustrating an example method 700, according to one example embodiment. Operations in the method 700 may be performed by the query enhancement system 150, using modules described above with respect to FIG. 2. As shown in FIG. 7, the method 700 includes operations 710, 712, 714, 716, and 718.

In one embodiment, the method 700 begins and the association module 240 identifies a set of user sessions that include a user term and a manufacturer-identified term in operation 710. In one example, the association module 240 adds records in a database for each term included in a user session. Each data record includes the term and the user session. The association module 240 then, for each term in the database, requests a number of user sessions that include the term. The association module 240 then, for each term that is included in multiple user sessions, searches the matching sessions for other terms.

In response to two or more terms that are included in multiple user sessions, the association module 240 then determines, at operation 712, whether a manufacturer-identified term is also included in the user sessions. In response to a threshold number of user sessions (that include the user term) also including the manufacturer-identified term, the method 700 continues at operation 714. In response to no other user sessions including a manufacturer-identified term, the method 700 ends.

At operation 714, the association module 240 associates the user term with the manufacturer-identified term. The method 700 continues at operation 716 and the intake module 220 receives a query from a different user. According to this example, the query includes the user term. The method 700 continues at operation 718 and the presentation module 260 presents search results based on the manufacturer-identified term and the method 700 ends.

In another example embodiment, the operation 716 includes the intake module 220 receiving a query that includes the manufacturer-identified term, and operation 718 includes presenting search results based on the user term. Therefore, although the user term may not be recognized by a manufacturer, the query enhancement system 150 still produces search results based on the manufacturer-identified term in response to receiving the user term in a query. In another example embodiment, although the query enhancement system 150 produces search results based on the user term and the manufacturer-identified term in response to receiving a query that includes the manufacturer-identified term, but not the user term. In this way, the query enhancement system 150 enhances product data by association manufacturer-identified term with user terms. Therefore, users of the query enhancement system may use either manufacturer-identified term or associated user terms to search for products at a network-based marketplace.

Figure 8:
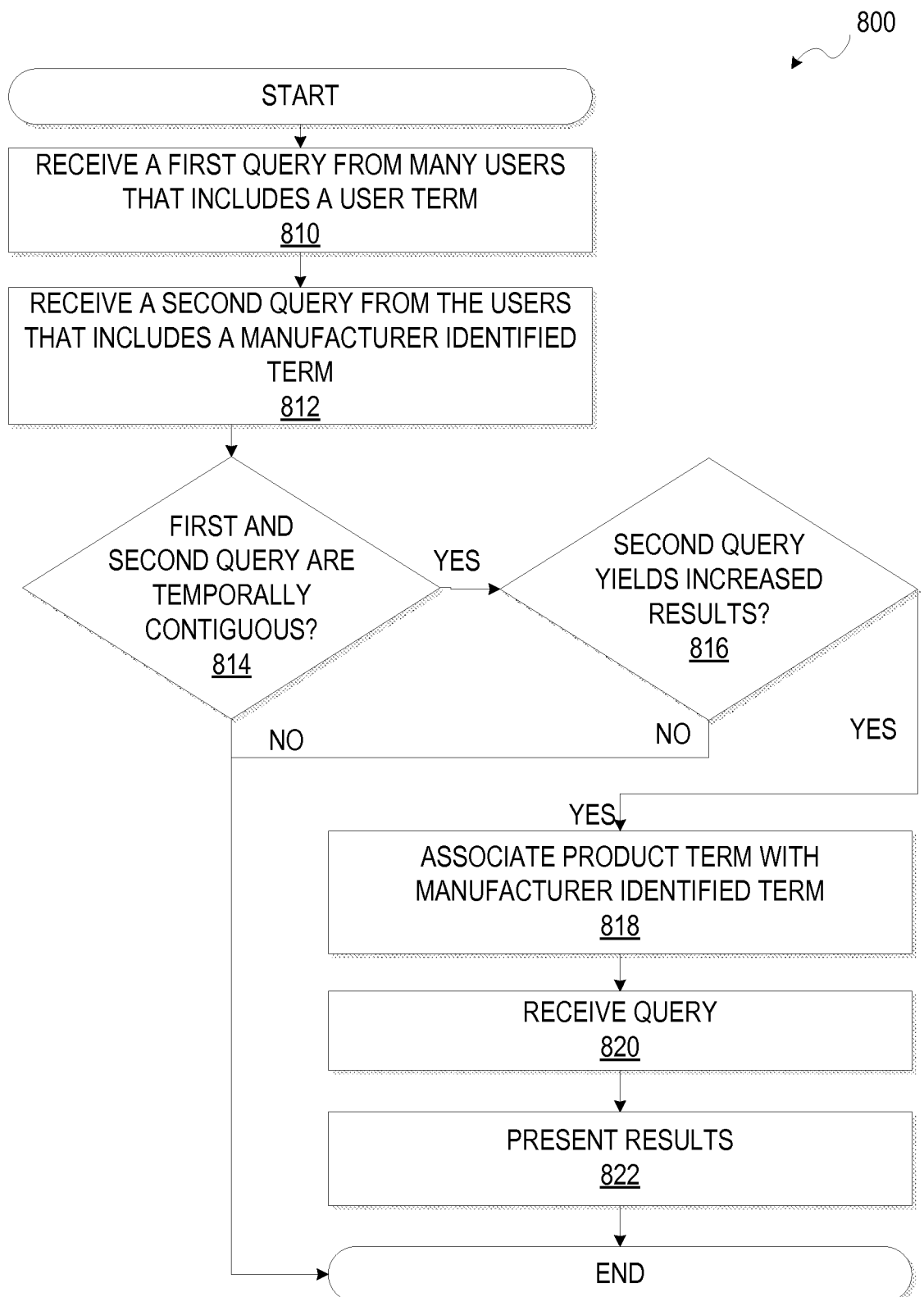
FIG. 8 is a flow diagram illustrating an example method according to an example embodiment.

FIG. 8 is a flow diagram illustrating an example method 800 for associating terms according to a second example embodiment. Operations in the method 800 may be performed by the query enhancement system 150, using modules described above with respect to FIG. 2. As shown in FIG. 8, the method 800 includes operations 810, 812, 814, 816, 818, 820, and 822.

The method 800 begins and at operation 810, the intake module 220 receives respective first queries from a set of users that include a user term as described herein. The method 800 continues at operation 812 and the intake module 220 receives respective second queries from the same set of users, in their respective user sessions, wherein the second queries include a manufacturer-identified term.

The method 800 continues at operation 814, the association module 240 determines user sessions where the first query and the second query were received in temporally contiguous submissions. In response to a threshold number of user sessions including the first query and the second query in temporally contiguous submissions, the method 800 continues at operation 816. Temporally contiguous, as described herein, includes at least receiving the queries without receiving other queries between the first query and the second query. In response to no user sessions including the first query and the second query in temporally contiguous submissions, the method 800 ends.

At operation 816, the association module 240 determines whether the second query in the respective user sessions yielded increased search results. In response to a threshold number of user sessions yielding increased search results based on the second query, the method 800 continues at operation 818. In response to insufficient second queries yielding increased search results, the method 800 ends.

At operation 818, the association module 240 associates the user term in the first query with the manufacturer-identified term in the second query. The method 800 continues at operation 820 and the intake module 220 receives another query that includes the user term. The method 800 continues at operation 822 and the presentation module 260 presents search results based on the associated manufacturer-identified term and the method 800 ends.

Figure 9:
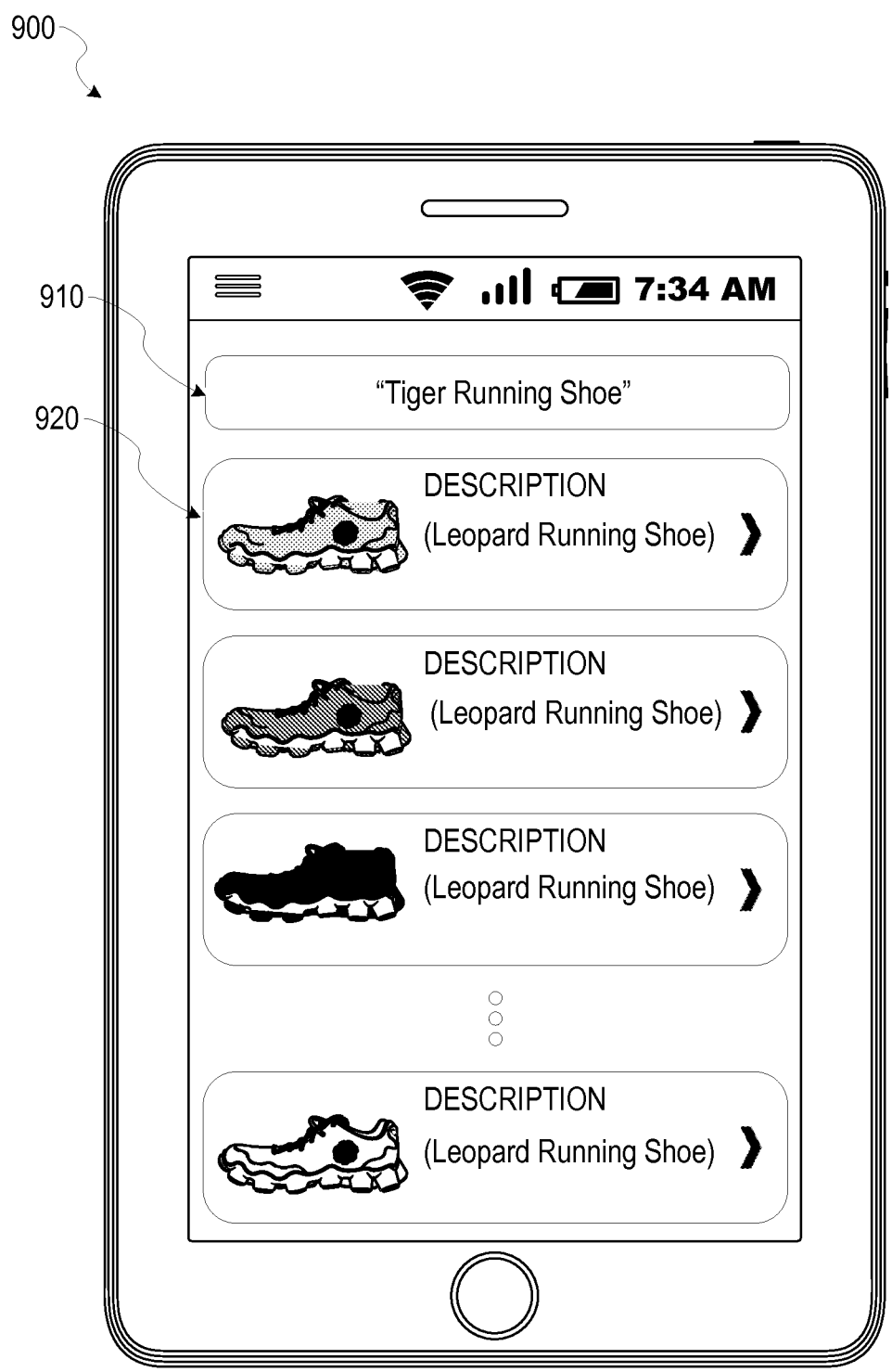
FIG. 9 is an illustration depicting a user interface employing a data query enhancement system according to an example embodiment.

FIG. 9 is an illustration depicting a user interface 900 employing a query enhancement system 150 according to an example embodiment. The user interface 900, according to this embodiment, operates at the client device 110, but this is not necessarily the case. According to this embodiment, the user interface 900 includes a query input field 910 and search results field 920.

As one skilled in the art may appreciate, the query input field 910 may include any input and/or output field or control and this disclosure is not limited in this way. In one embodiment, the query input field 910 may receive one or more search terms from a user. In another embodiment, the query input field 910 includes one or more selections, and the client device 110 constructs the query based on the user selections.

In another embodiment, the search results field 920 presents search results for the user based on the query. As described herein, the search results field 920 presents search results as directed by the presentation module 260.

According to one example, the query input field 910 receives the query "Tiger Running Shoe" from the user. In response, because the association module 240 has associated "Tiger" with the Leopard running shoe, the presentation module 260 presents search results using "Leopard Running Shoe."

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-9 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 10:
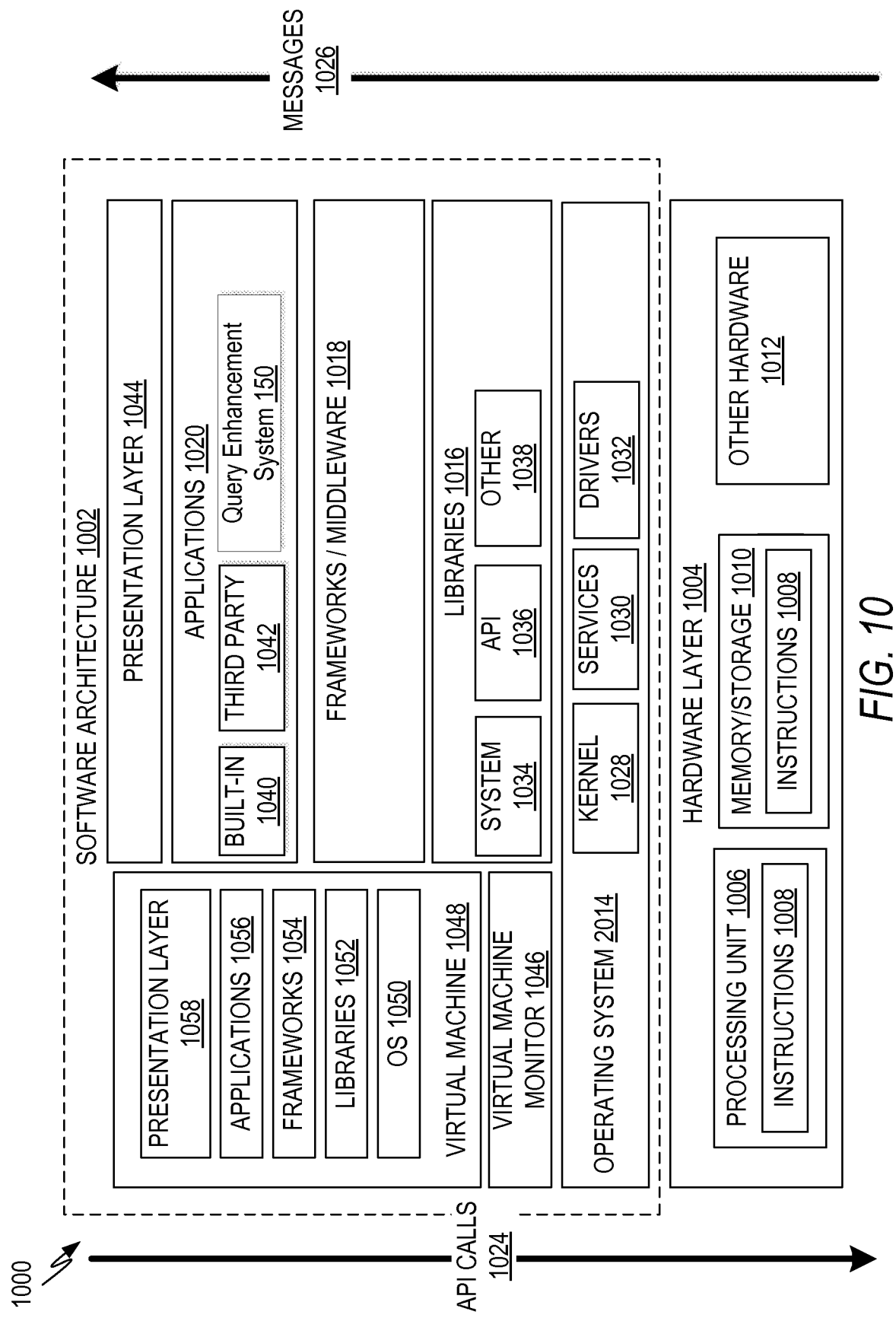
FIG. 10 is a block diagram illustrating an example of a software architecture that may be installed on a machine, according to some example embodiments.

FIG. 10 is a block diagram 1000 illustrating a representative software architecture 1002, which may be used in conjunction with various hardware architectures herein described. FIG. 10 is merely a non-limiting example of a software architecture 1002 and it will be appreciated that many other architectures may be implemented to facilitate the functionality described herein. The software architecture 1002 may be executing on hardware such as machine 1100 of FIG. 11 that includes, among other things, processors 1110, memory 1130, and I/O components 1150. A representative hardware layer 1004 is illustrated and can represent, for example, the machine 1100 of FIG. 11. The representative hardware layer 1004 comprises one or more processing units 1006 having associated executable instructions 1008. Executable instructions 1008 represent the executable instructions of the software architecture 1002, including implementation of the methods, modules and so forth of FIGS. 1-9. Hardware layer 1004 also includes memory and/or storage modules 1010, which also have executable instructions 1008. Hardware layer 1004 may also comprise other hardware as indicated by 1012 which represents any other hardware of the hardware layer 1004, such as the other hardware illustrated as part of machine 1100.

In the example architecture of FIG. 10, the software 1002 may be conceptualized as a stack of layers where each layer provides particular functionality. For example, the software 1002 may include layers such as an operating system 1014, libraries 1016, frameworks/middleware 1018, applications 1020 and presentation layer 1022. Operationally, the applications 1020 and/or other components within the layers may invoke application programming interface (API) calls 1024 through the software stack and receive a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third party applications 1042. Examples of representative built-in applications 1040 may include, but are not limited to, a contacts application, a browser application, a book reader application, a location application, a media application, a messaging application, and/or a game application. In a specific embodiment, the query enhancement system is implemented as an application 1029. In this embodiment, the query enhancement system 150 in implemented in conjunction with other frameworks and/or middleware and may implement one or more libraries 1016. In another embodiment, the query enhancement system 150 is implemented as an application server 140 and operates as part of the network 102 to perform one or more of the functions and/or methods described herein. Also, the association module 220 may store the associations and/or other data described herein in the database 126 by transmitting the associations to the database server 124 for storage.

Third party applications 1042 may include any of the built in applications 1040 as well as a broad assortment of other applications. In a specific example, the third party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system libraries 1034, API libraries 1036, and other libraries 1038), frameworks/middleware 1018 to create user interfaces to interact with users of the system. Alternatively, or additionally, in some systems, interactions with a user may occur through a presentation layer, such as presentation layer 1022. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware machine (such as the machine of FIG. 11, for example). A virtual machine is hosted by a host operating system (operating system 1014 in FIG. 10) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Example Machine Architecture and Machine-Readable Medium

Figure 11:
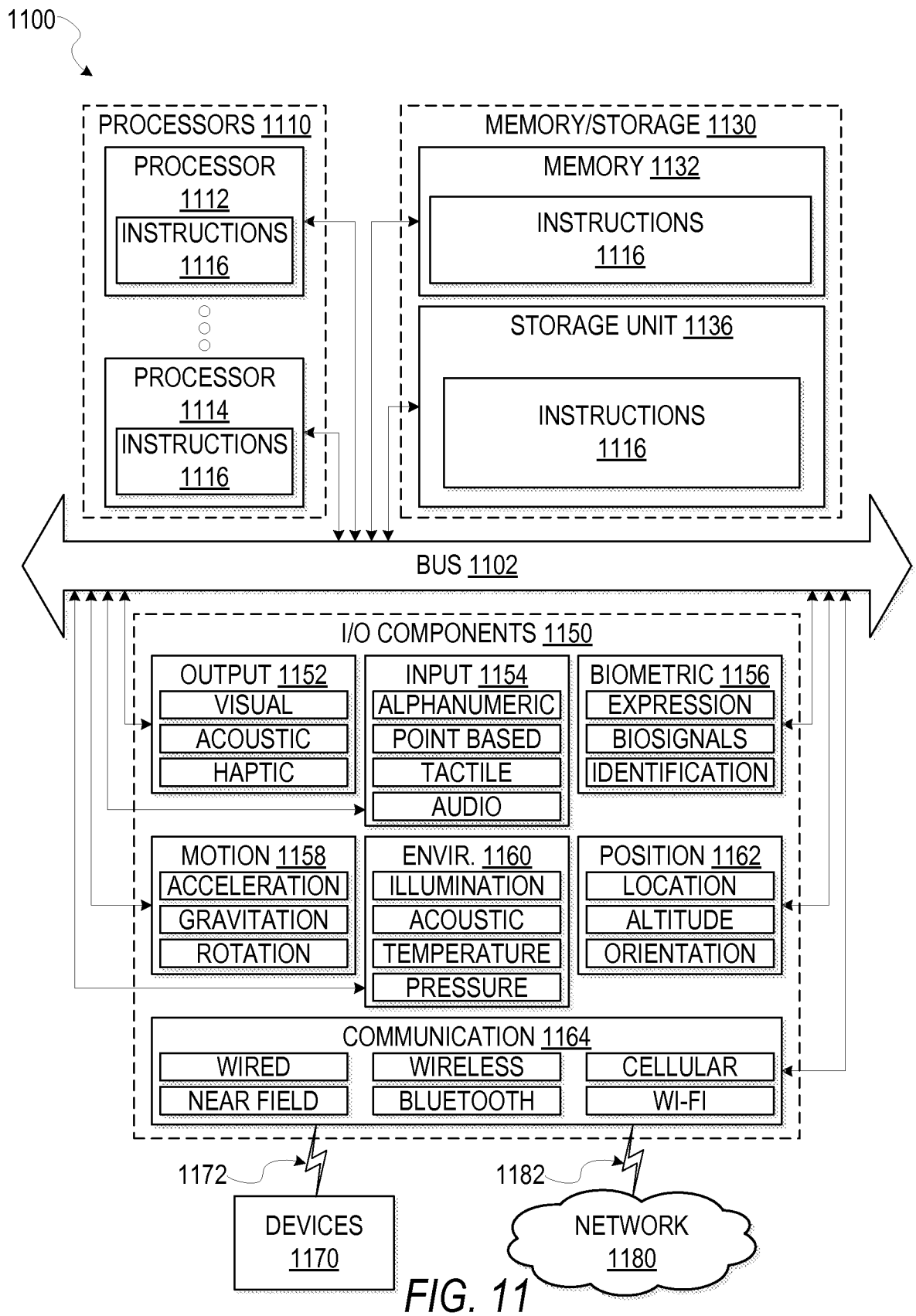
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions may cause the machine to execute the flow diagrams of FIGS. 5-8. Additionally, or alternatively, the instructions may implement the intake module 220, the association module 240, and the presentation module 260 of FIG. 2, and so forth. The instructions transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processor that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented system comprising:
one or more processors; and
one or more computer storage media storing computer-usable instructions that, when used by the one or more processors, cause the system to perform a method comprising:
receiving user data generated from user interactions with a networked system in user sessions, the user interactions indicating at least a manufacturer-identified term for an item and at least a user term for the item; and
in response to a search query that includes the user term, transmitting, to a user device, at least one search result selected using the search query enhanced with the manufacturer-identified term for the item based on a number of the user sessions that include the user term and the manufacturer-identified term based on the manufacturer-identified term being associated with the item in the number of the user sessions.

2. The system of claim 1, wherein the number is of the user sessions that include a user action involving the item.

3. The system of claim 1, wherein the number is of the user sessions that include at least one of purchasing the item, placing the item in a virtual shopping cart, or placing the item on a watch list.

4. The system of claim 1, wherein the user interactions indicate the manufacturer-identified term and the user term in temporally contiguous submissions.

5. The system of claim 1, wherein the user term represents the item in a foreign language.

6. The system of claim 1, wherein the manufacturer-identified term comprises at least one of a brand, a model number, or a part number.

7. The system of claim 1, wherein the manufacturer-identified term is associated with the user term based at least in part on a type of user action in a user session of the user sessions.

8. The system of claim 1, wherein the manufacturer-identified term is associated with the user term based at least in part on a time difference between the user term for and the manufacturer-identified term appearing within a user session of the user sessions.

9. The system of claim 1, wherein the manufacturer-identified term is associated with the user term based at least in part on a number of search results that would be generated without the search query being enhanced with the manufacturer-identified term for the item.

10. A computer implemented method comprising:
receiving user interactions in user sessions, the user interactions indicating at least a manufacturer-identified term for an item and at least a user term for the item; and
in response to a search query that indicates the user term, presenting, on a user device, at least one search result selected using the search query enhanced with the manufacturer-identified term for the item based on a number of the user sessions that include the user term and the manufacturer-identified term based on the manufacturer-identified term being associated with the item in the number of the user sessions.

11. The method of claim 10, wherein the number is of the user sessions that include a user action involving the item.

12. The method of claim 10, wherein the number is of the user sessions that include at least one of purchasing the item, placing the item in a virtual shopping cart, or placing the item on a watch list.

13. The method of claim 10, wherein the user interactions indicate the manufacturer-identified term and the user term in temporally contiguous submissions.

14. The method of claim 10, wherein the user term represents the item in a foreign language.

15. The method of claim 10, wherein the manufacturer-identified term comprises at least one of a brand, a model number, or a part number.

16. The method of claim 10, wherein the manufacturer-identified term is associated with the user term based at least in part on a type of user action in a user session of the user sessions.

17. A non-transitory machine-readable storage medium comprising instruction that, when executed by one or more processors of a machine, cause the machine to perform a method comprising:
receiving user interactions in a user session, the user interactions providing a user-specified search query that includes at least a user term for an item followed by a user action involving the item; and
in response to a user-specified search query that includes the user term, presenting, on a user device, at least one search result selected using the user-specified search query enhanced with at least a manufacturer-identified term for the item based on the user action involving the item following the user-specified search query that includes the user term, and based on the manufacturer-identified term being associated with the item in a number of user sessions.

18. The machine-readable storage medium of claim 17, wherein the user action includes at least one of purchasing the item, placing the item in a virtual shopping cart, or placing the item on a watch list.

19. The machine-readable storage medium of claim 17, wherein the manufacturer-identified term is used to enhance the user-specified search query based at least in part on a type of the user action.

20. The machine-readable storage medium of claim 17, wherein the user-specified search query and user action are provided by the user interactions in temporally contiguous submissions.

* * * * *